B. F. SUMMEROUR.
COTTON SEED LINTER.
APPLICATION FILED FEB. 25, 1916.
1,243,895. Patented Oct. 23, 1917.
2 SHEETS—SHEET 2.
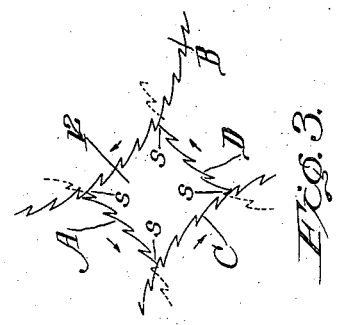
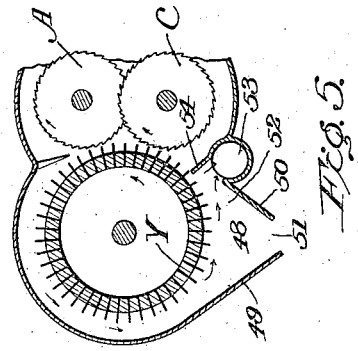
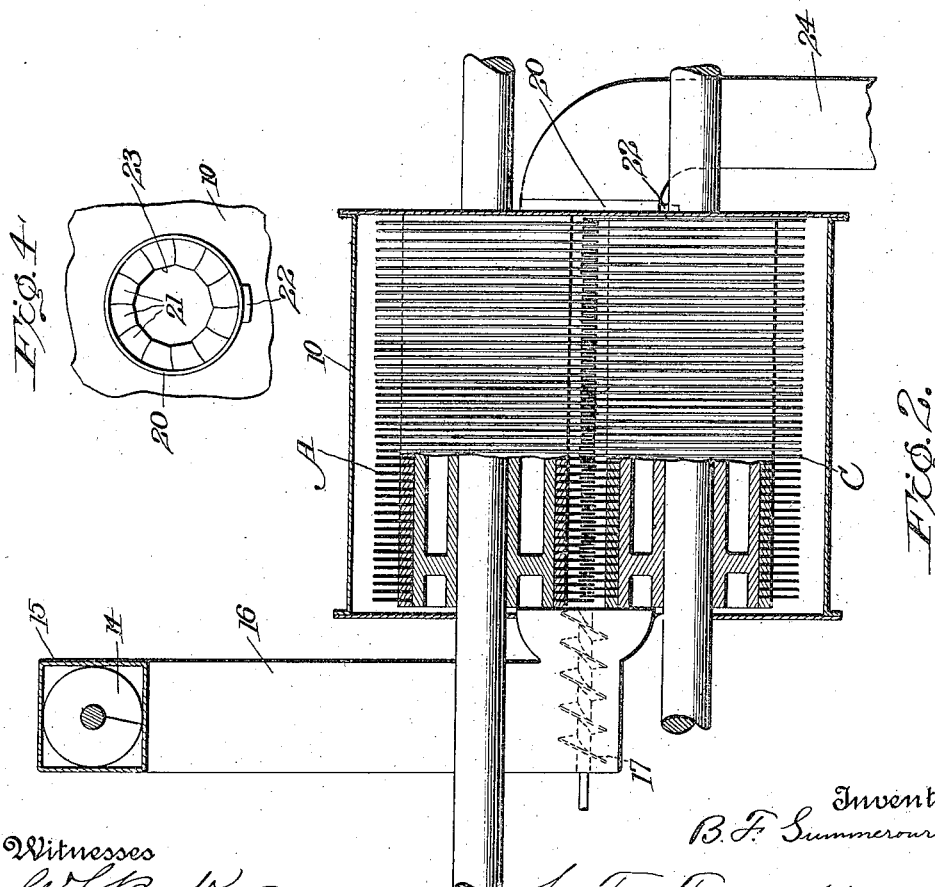
Witnesses
G. T. Baker
E. L. Greenewald
Inventor
B. F. Summerour
by Foster Freeman Watson & Hart
Attorney

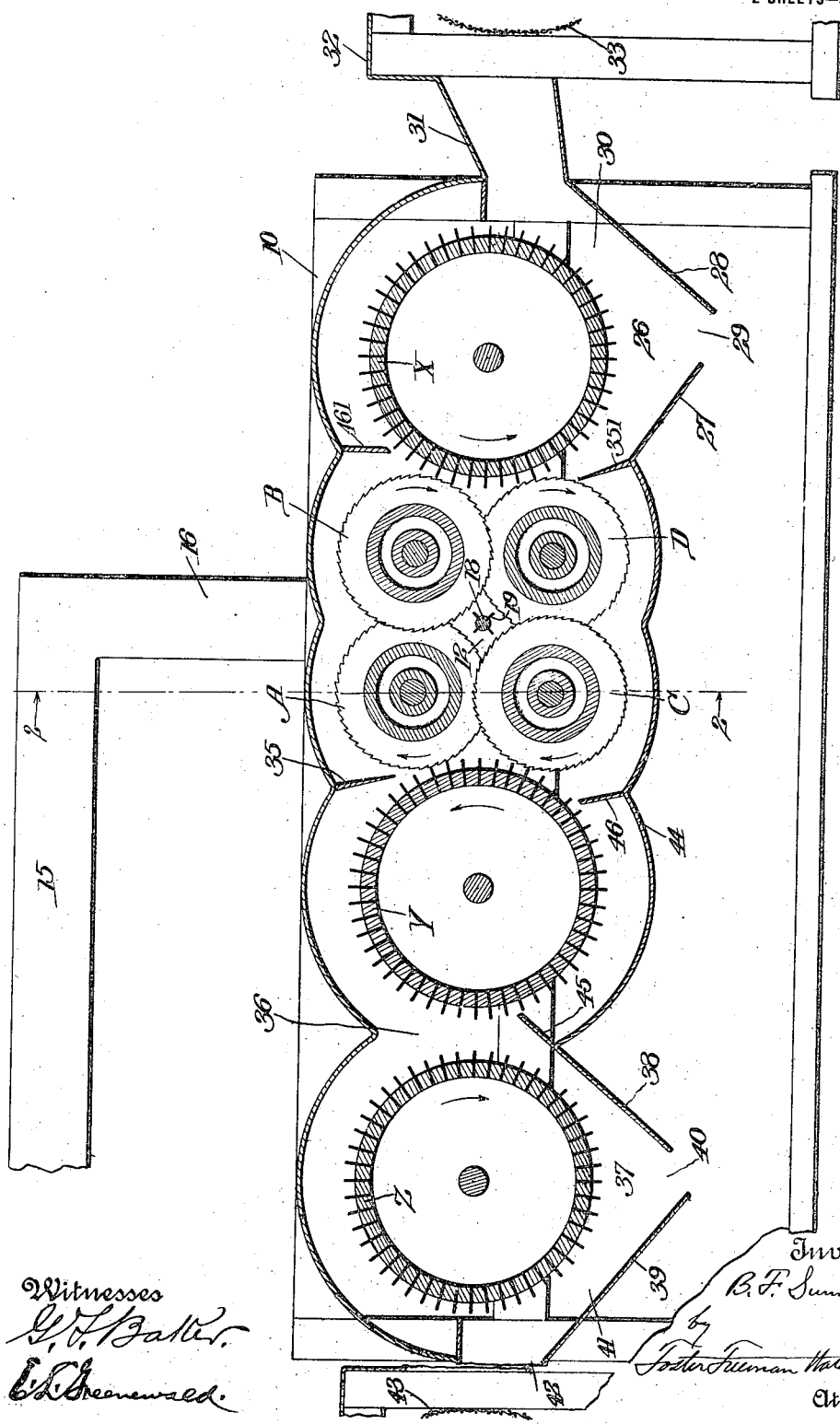

UNITED STATES PATENT OFFICE.

BENJAMIN F. SUMMEROUR, OF GRETNA, LOUISIANA.

COTTON-SEED LINTER.

1,243,895.  Specification of Letters Patent.  Patented Oct. 23, 1917.

Application filed February 25, 1916. Serial No. 80,417.

*To all whom it may concern:*

Be it known that I, BENJAMIN F. SUMMEROUR, a citizen of the United States, residing at Gretna, Jefferson Parish, State of Louisiana, have invented certain new and useful Improvements in Cotton-Seed Linters, of which the following is a specification.

My invention relates to a multiple saw cylinder ginning and linting machine and has particular reference to machines which are adapted for removing the lint from cotton seed after the first ginning, but it will be understood that certain features of the invention are applicable to cotton gins as well as linters.

The principal object of my invention is to provide an efficient machine of the above character which will have a greater capacity than machines now in general use and which will eliminate many troublesome parts which continually require adjustment.

Another object is to provide a machine which will more efficiently cut the lint off the cotton seed by a shearing action of two adjacent oppositely moving saws, each cutting on the same seed at the same time.

Another object is to eliminate the ordinary ribs which are used with saw cylinders for keeping the seed from falling through into the space between the saws.

The above and other objects and the novel features of my invention will be apparent from the following description taken in connection with the drawing in which, Figure 1 is a longitudinal central sectional view of a linting machine embodying my invention;

Fig. 2 is a view of the machine, partly in section, on the line 2—2 of Fig. 1 and partly in elevation;

Figs. 3 and 4 are detail views;

Fig. 5 is a detail view of a portion of another device embodying my invention.

Referring to the drawings, the machine comprises a casing 10 which incloses the saw and brush cylinders of the machine and is closed at the sides, ends and top, all side drafts being cut off to form a substantially closed chamber. Suitable bearings are provided for supporting a group of four saw cylinders, A, B, C and D. These saw cylinders are similar in all respects to each other and to the cylinders now generally in use, except that the saws 11 thereof are spaced a smaller distance apart, for a purpose to be described. The saw cylinders A and B are disposed directly above the saw cylinders C and D, respectively, and the gang of saws on each cylinder extends a slight distance into the space between the saws on the adjacent cylinders. The arrangement of the cylinders and saws in this manner provides a seed chamber 12 within the group of saw cylinders, which chamber is open only at opposite ends and is practically closed on all sides by the gangs of saws, the clearance between the interfitting saws being very slight so as to prevent the escape of mature seeds from the space 12, but permitting the removal of the lint from the seeds. The several saw cylinders are rotated in the directions indicated by the arrows thereon and it will be noticed that the overlapping saws rotate in opposite directions at every point by means of which the seed is subjected to a shearing action to cut off the lint thereon. The arrangement of the saws in this manner serves to more completely remove the lint from the seed and also eliminates the necessity of the usual ribs used on the ordinary one cylinder and other machines and even more effectively prevents the loss of seed through the spaces between the saws. Fig. 3, which is an enlarged view of the chamber 12 and intersecting points $s$ of the saws, indicates the shearing action at the four points of intersection of the saws. It will be noted that the teeth of the saw traveling in one direction are inclined in the opposite direction to the teeth of the saw traveling in the opposite direction at each intersecting point $s$. The saw teeth are constructed so as not to mutilate the seed but will simply shear off the lint thereon.

Referring to Fig. 2, the spiral conveyer 14 in the casing 15 supplies the seed to a chute 16 and by means of a conveyer 17 in the bottom of the chute 16 the seed is delivered to the inlet end of the chamber 12 into which the chute discharges. The float device 18 in the seed chamber 12 consists of a shaft with cross arm lugs attached, to which are fastened strap irons 19 extending lengthwise of the shaft. The strap irons 19 have a considerable throw to get the desired conveying action as well as to maintain a firm roll. It will therefore be seen that this float device has a two-fold function, first to form a firm roll to aid in the cutting of cotton or lint off of the seed, and second to act as a means of conveying seed or cotton lengthwise of the saw cylinders and force the cleaned seed out of the discharge at the opposite side of the casing. The discharge end of the seed or roll chamber 12 is provided with a regulating device 20 such as shown in Fig. 4 which is similar to the shutter of an ordinary camera and the leaves 21 thereof may be adjusted by a handle 22 to provide a larger or smaller opening 23, thereby allowing more or less seed to pass out in a given length of time so as to regulate the closeness of the cut. The seed is discharged into a chute 24 connected at the outlet end of the chamber 12.

The lint removed by the saws is carried through the spaces between the saws and removed from the saws by the brushes on the peripheries of the brush cylinders X and Y which are located in the casing 10 parallel to the saw cylinders. The brushes X and Y rotate in the directions indicated by the arrows thereon and the contacting portions of the brushes and saw cylinders move in the same direction. The brush cylinders, however, rotate at a much higher speed than the saw cylinders, the brushes rotating at about 1,000 R.P.M. and the saws at about 300 to 350 R.P.M. The high speed of the brush cylinders causes a draft which will assist in removing the lint from the saw teeth and from the spaces between the saws.

The lint removed from the saws B and D by the brush X is discharged downwardly beneath the brush cylinder into a space 26 opposite the plate 27 and mote board 28. The plate 27 and board 28 extend the entire length of the casing 10 and their lower edges are separated so as to provide an opening 29 which constitutes an inlet for air and an outlet for motes and trash. The mote board 28 is widely separated from the lower side of the brush cylinder X and together with the brush cylinder forms an upwardly extending flue 30 for lint which discharges into a lint flue 31 leading to the casing 32 of a condenser 33 on which the lint is collected. The rotation of the brush X produces a gentle draft up the lint flues 30 and 31 and through and across the opening 29 which is sufficient to carry up the light lint fibers, whereas the motes, small seed and other trash will pass downwardly through the opening 29 into a suitable conveyer (not shown).

The brush Y which contacts with the saw cylinders A and C at the left also has its contacting surface moving in the same direction as the adjacent parts of the saw cylinders and accordingly rotates upwardly in a direction opposite to the rotation of the brush cylinder X on the other side of the seed chamber. In order to prevent an interference of air currents a division board 35 has its end located adjacent the saw cylinder A above the point of contact between said cylinder and the brush cylinder Y. The lint is carried around over the brush cylinder and discharged on the opposite side of the brush cylinder from the saw cylinders. In order to obtain an efficient separation of the motes and trash from the lint discharged by the cylinder Y, I provide an additional brush cylinder Z located opposite the opening 36 through which the lint is discharged by the cylinder Y. The brush cylinder Z rotates in the direction opposite to the brush cylinder Y so that the adjacent parts of the two cylinders will be moving in the same direction. The speeds of the cylinders Y and Z are high in comparison with the speeds of the saws in order that they will remove the lint partly by the draft created due to their fan action. The cylinder Z discharges the lint and motes downwardly from the cylinder Y into the space 37 between the plate 38 and mote board 39 which correspond to the plate 27 and mote board 28, respectively. The lower ends of the plate 38 and board 39 are separated so as to provide an opening 40 through which air may enter and carry the lint up the flues 41 and 42 to the condenser 43 upon which the lint is collected in a manner well known. The gentle draft created by the flues 41 and 42 carries only the lint fibers, and the motes, small seed and other trash will be discharged through the opening 40 into a suitable conveyer (not shown). The curved board 44 which extends between the upper ends of the boards 38 and 27 forms a bottom for the chamber containing the saw and brush cylinders so as to prevent air currents which would interfere with the collection of the lint and the separation of the motes therefrom. Suitable division boards 45 and 46 extend upwardly from the bottom 44 close to the brush Y so that the lint and air will not be carried around the board 45, deflecting the same downwardly into the space 37. It will be understood that in some forms it will be unnecessary to provide the additional brush Z in order to collect the lint removed from the saw cylinders A and C by the brush Y as a suitable flue and mote boards may be directly applied to the casing of the cylinder Y, as indicated in Fig. 5. In that figure the lint and motes are carried over and around the brush Y and discharged into the space 48 which is opposite the mote boards 49 and 50. The lower ends of the boards 49 and 50 are separated to provide the opening 51 through which air may be admitted and the motes discharged. The gentle current of air up the flue 52 causes the lint to be carried into the lint flue 53 at the upper end of the flue 52. The lint flue 53 leads to a condenser such as is shown in Fig. 1 where the lint is collected. A deflector board 54 extends from the top of the flue 53 up close to the periphery of the cylinder Y to prevent interfering air currents and to keep the lint from rotating with the brush.

The operation of the machine will be apparent from the foregoing description. The seed is forced into the end of the seed chamber and as it moves along the seed chamber the lint is sheared off of the seeds and carried by the saws into contact with the brushes and by suitable flues to the condensing devices after the motes have been separated by suitable mote boards. By regulating the flow of the seed through the seed chamber 12 the seed can be thoroughly delinted before it is delivered at the discharge end. The cotton or lint will be freed from motes and other trash when it reaches the condensers. The capacity of the machine is very large and the proportionate attention required is small.

While I have shown and described my invention in detail it is to be understood that I do not wish to be limited to the exact construction as shown as it is obvious that various changes may be made therein without departing from the spirit of the invention.

Having thus described the invention, what is claimed and desired to be secured by Letters Patent is:

1. In a machine of the class described, the combination of a plurality of horizontal saw cylinders carrying spaced vertical saws and supported so as to form a horizontal chamber between them, the saws of the several cylinders extending into the spaces between the saws on adjacent cylinders and being set closely together so as to permit the removal of fiber only through said spaces by said saws, means for moving the material longitudinally through the chamber between the saw cylinders and transversely of the saws, and means for collecting the fiber removed by said saws.

2. In a cotton seed linter, the combination of a plurality of horizontal coöperating saw cylinders carrying vertical spaced saws, said cylinders being supported so as to form a horizontal seed chamber between them, the saws of the several cylinders extending into the spaces between the saws on adjacent cylinders and being set closely together so as to prevent the discharge of seed from said chamber through the spaces between the saws but permitting the removal of lint from said seed through said spaces by said saws, means for causing the seed to move longitudinally of the seed chamber and transversely of the saws, and means for collecting the lint removed from the seed by said saws.

3. In a machine of the class described, the combination of a casing, a plurality of saw cylinders mounted in said casing so as to form a chamber between the cylinders closed on all sides except the ends, brushing means in said casing for removing the fiber from said saw cylinders, means for collecting the fiber, and means for separating the motes and trash from the fiber after the fiber leaves the saw cylinders and before it reaches the collecting means.

4. In a machine of the class described, the combination of a plurality of horizontally disposed saw cylinders carrying spaced saws and forming a horizontal chamber closed on all sides except the ends, the saws of the several cylinders extending into the spaces between the saws on adjacent cylinders and being set closely together to permit the removal of fiber only through said spaces by said saws, horizontal brush cylinders for removing the fiber from the saw cylinders, and means for collecting the removed fiber.

5. In a cotton seed linter, the combination of a group of four horizontally disposed saw cylinders positioned to form a horizontal chamber between them for confining cotton seed, a device in said chamber for feeding seed longitudinally thereof and agitating the seed, means for feeding seed into one end of said chamber, an outlet for the delinted seed at the opposite end of the chamber, a pair of horizontal brush cylinders for removing lint from the saws, one brush cylinder contacting with each pair of saws, means for collecting the lint, and means for separating the motes and trash from the lint after said lint leaves the saw cylinders and before it reaches said collecting means.

6. In a cotton seed linter, the combination of a casing, a plurality of horizontally disposed rotatable saw cylinders in said casing, the cylinders carrying spaced saws and the saws of the several cylinders extending into the spaces between the saws on adjacent cylinders and being set closely together to form a horizontal seed chamber closed on all sides except the ends, said saws being set so as to permit the saws to remove lint from said chamber through the spaces between the saws but preventing the removal of seed from the seed chamber by the saws, means for feeding seed to said seed chamber, horizontal rotatable brushing cylinders for removing lint from said saw cylinders, and division boards inside said casing for controlling the air currents in the casing.

7. In a cotton seed linter, the combination of a plurality of saw cylinders forming a chamber for confining cotton seed, means for feeding seed into one end of said chamber, an outlet for delinted seed at the opposite end of said chamber, brush cylinders on opposite sides of said chamber for removing lint from the saw cylinders, means for collecting the lint, and means for separating the motes and trash from the lint after the lint leaves the saw cylinders and before it reaches the collecting means.

8. In a cotton seed linter, the combination of a casing forming a substantially closed chamber, a plurality of horizontally disposed saw cylinders in said casing mounted so as to form a horizontal seed chamber between the saw cylinders, brushing cylinders in said casing on opposite sides of said seed chamber for removing the lint from the saw cylinders, condensing devices at opposite ends of said casing for receiving and collecting the lint, and mote boards for causing the separation of the motes and trash from the lint before it is delivered to the collecting devices.

9. In a cotton seed linter, the combination of a casing forming a substantially closed chamber, a plurality of horizontally disposed saw cylinders in said casing forming a horizontal seed chamber closed on all sides except the ends, the saw cylinders carrying spaced saws and the saws of the several cylinders extending into the spaces between the saws on adjacent cylinders, and being set closely together to prevent the removal of seed from said seed chamber through the spaces between the saws but permitting the removal of the lint from the seed by the saws, an agitating and feeding device in the seed chamber, means for feeding seed into one end of the seed chamber, an outlet for delinted seed at the opposite end of the seed chamber, means for regulating the flow of seed through the seed chamber, brush cylinders in said casing contacting with the outer sides of the saw cylinders on opposite sides of said seed chamber and adapted to remove the lint from the saw cylinders, condensers at the opposite ends of the casing for collecting the lint removed from the saws on opposite sides of the seed chamber, and means for causing the separation of the motes and trash from the lint before it is delivered to the condensers.

10. In a machine of the class described, the combination of a casing, a group of saw cylinders therein and mounted so as to form a seed chamber between them, said chamber being closed by said saw cylinders on all sides except the ends, the peripheries of the saws forming the walls of said chamber moving in the same general direction to cause a continuous rotating action to rotate the material in the seed chamber, brush cylinders in said casing on opposite sides of said seed chamber, one brush cylinder contacting with each pair of the saw cylinders, condensers, and separating means between the saw cylinders and the condensers.

11. In a cotton seed linter, the combination of a casing forming a substantially closed chamber, a group of four horizontally disposed saw cylinders in said casing carrying spaced saws, the saws of the several cylinders extending into the space between the saws on the adjacent cylinders and forming a horizontal seed chamber within the group of saw cylinders closed on all sides except the ends, the saws being set closely together to prevent the removal of the seed from the seed chamber but permitting the removal of lint by the saws, a brush cylinder mounted on each side of the seed chamber, each adapted to engage the saws on a pair of saw cylinders to brush the lint therefrom, condensing means for collecting the lint, lint flues leading from the casing on the sides opposite the brush cylinders to the condensing means, and devices for causing the separation of the motes and trash from the lint before it enters the lint flues.

In testimony whereof I affix my signature

BENJAMIN F. SUMMEROUR.

Copies of this patent may be obtained for five cents each, by addressing the "Commissioner of Patents, Washington, D. C."